US012782106B2

(12) United States Patent
Kitagawa et al.

(10) Patent No.: US 12,782,106 B2
(45) Date of Patent: Nov. 3, 2026

(54) LASER INTERFEROMETER

(71) Applicant: SEIKO EPSON CORPORATION, Tokyo (JP)

(72) Inventors: Jun Kitagawa, Matsumoto (JP); Kohei Yamada, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 112 days.

(21) Appl. No.: 19/016,326

(22) Filed: Jan. 10, 2025

(65) Prior Publication Data

US 2025/0231018 A1 Jul. 17, 2025

(30) Foreign Application Priority Data

Jan. 11, 2024 (JP) ................................ 2024-002359

(51) Int. Cl.
*G01B 9/02* (2022.01)
*G01B 9/02001* (2022.01)

(52) U.S. Cl.
CPC ................................ *G01B 9/02001* (2013.01)

(58) Field of Classification Search
CPC .. G01B 9/20; G01B 9/02001; G01B 9/02002; G01B 9/02034
See application file for complete search history.

(56) References Cited

U.S. PATENT DOCUMENTS

| | | | | | |
|---|---|---|---|---|---|
| 12,313,448 | B2 * | 5/2025 | Yamada | .................. | G01H 9/00 |
| 2013/0229664 | A1 | 9/2013 | Nishikawa | | |
| 2020/0309953 | A1 | 10/2020 | Yamada | | |
| 2022/0065614 | A1 * | 3/2022 | Yamada | ............ | G01B 9/02002 |

FOREIGN PATENT DOCUMENTS

| | | | |
|---|---|---|---|
| JP | H08-219738 | A | 8/1996 |
| JP | 2007-285898 | A | 11/2007 |
| JP | 2013-181828 | A | 9/2013 |
| JP | 2020-165700 | A | 10/2020 |
| JP | 2022-038156 | A | 3/2022 |

* cited by examiner

*Primary Examiner* — Kevin K Pyo
(74) *Attorney, Agent, or Firm* — Harness, Dickey & Pierce, P.L.C.

(57) ABSTRACT

A laser interferometer including: a laser light source configured to output laser light; a light splitter configured to split the laser light into first split light and second split light; a light modulator configured to modulate a frequency of the first split light to generate reference light; a light receiver configured to receive object light generated by the second split light reflected off by a target object, and the reference light; and a first light collecting lens disposed in an optical path of the first split light or an optical path of the second split light and configured to collect incident light, wherein the first light collecting lens is configured that an optical diameter of the incident light is smaller than an optical diameter of non-incident light at the light receiver.

10 Claims, 11 Drawing Sheets

| | WHEN FIRST LIGHT COLLECTING LENS 13 IS NOT PROVIDED | WHEN FIRST LIGHT COLLECTING LENS 13 IS PROVIDED |
|---|---|---|
| LIGHT INTENSITY DISTRIBUTION IN FORM OF PICTURE PRODUCED WHEN OPTICAL PATHS P2 AND P3 POSITIONALLY DEVIATE FROM EACH OTHER |   |   |
| RESISTANCE TO DISTURBANCE | LOW | HIGH |
| EASINESS OF ALIGNMENT | LOW | HIGH |

| | WHEN LIGHT RECEIVER 10 IS DISPOSED CLOSER THAN FOCAL POINT FC1 | WHEN LIGHT RECEIVER 10 IS DISPOSED FARTHER THAN FOCAL POINT FC1 |
|---|---|---|
| PICTURES OF LIGHT RAYS CONTAINED IN REFERENCE LIGHT L2 AND OBJECT LIGHT L3 |   |   |
| RESISTANCE TO DISTURBANCE | LOW | HIGH |
| EASINESS OF ALIGNMENT | LOW | HIGH |

LASER INTERFEROMETER

The present application is based on, and claims priority from JP Application Serial Number 2024-002359, filed Jan. 11, 2024, the disclosure of which is hereby incorporated by reference herein in its entirety.

BACKGROUND

1. Technical Field

The present disclosure relates to a laser interferometer.

2. Related Art

JP-A-2007-285898 discloses a laser vibrometer as an apparatus that measures a vibration speed of an object. In the measurement made by the laser vibrometer, an object to be measured is irradiated with laser light, and the vibration speed is measured based on scattered laser light subjected to a Doppler shift.

The laser vibrometer described in JP-A-2007-285898 includes a vibrating element that generates a predetermined frequency. The vibrating element shifts the frequency of incident laser light based on the vibration frequency to generate reflected laser light having a frequency different from that of the incident laser light. In the laser vibrometer, the reflected laser light is used as reference light. Scattered laser light associated with the object to be measured and the reference light are then multiplexed, and the resultant light is received with a photodetector, from which a beat signal is electrically extracted. The vibration speed of the object to be measured is then measured from the beat signal.

JP-A-2007-285898 is an example of the related art.

In a laser interferometer such as a laser vibrometer, scattered laser light (object light) associated with an object to be measured and reference light are multiplexed, and the resultant light is received with a photodetector. In this process, the object light beam and the reference light beam interfere with each other in a region where the two types of light are superimposed on each other (superimposition region), so that the vibration speed or any other factor of the object can be measured.

To form the superimposition region described above, however, it takes time and effort to position (align) portions that constitute the interference optical system. Such time and effort reduces usability of the laser interferometer. Furthermore, when the alignment deteriorates due to disturbance such as vibration and impact, measurement accuracy of the laser interferometer decreases.

It is instead conceivable to cancel the effects of the disturbance, for example, by using a sensor, in which case, however, there is a concern about increase in size and weight of the laser interferometer.

It is therefore a challenge to realize a laser interferometer that can suppress an increase in the size thereof, has measurement accuracy that is unlikely to decrease even when the laser interferometer receives disturbance, and excels in usability.

SUMMARY

A laser interferometer according to an application example of the present disclosure includes

- a laser light source configured to output laser light;
- a light splitter configured to split the laser light into first split light and second split light;

- a light modulator configured to modulate a frequency of the first split light to generate reference light;
- a light receiver configured to receive object light generated by the second split light reflected off by a target object, and the reference light; and
- a first light collecting lens disposed in an optical path of the first split light or an optical path of the second split light and configured to collect incident light, and
- when the first light collecting lens is disposed in the optical path of the first split light, the first light collecting lens is so configured that an optical diameter of the reference light is smaller than an optical diameter of the object light at the light receiver, and
- when the first light collecting lens is disposed in the optical path of the second split light, the first light collecting lens is so configured that the optical diameter of the object light is smaller than the optical diameter of the reference light at the light receiver.

DESCRIPTION OF EMBODIMENTS

A laser interferometer according to each embodiment of the present disclosure will be described below in detail with reference to the accompanying drawings.

1. First Embodiment

Figure 1:
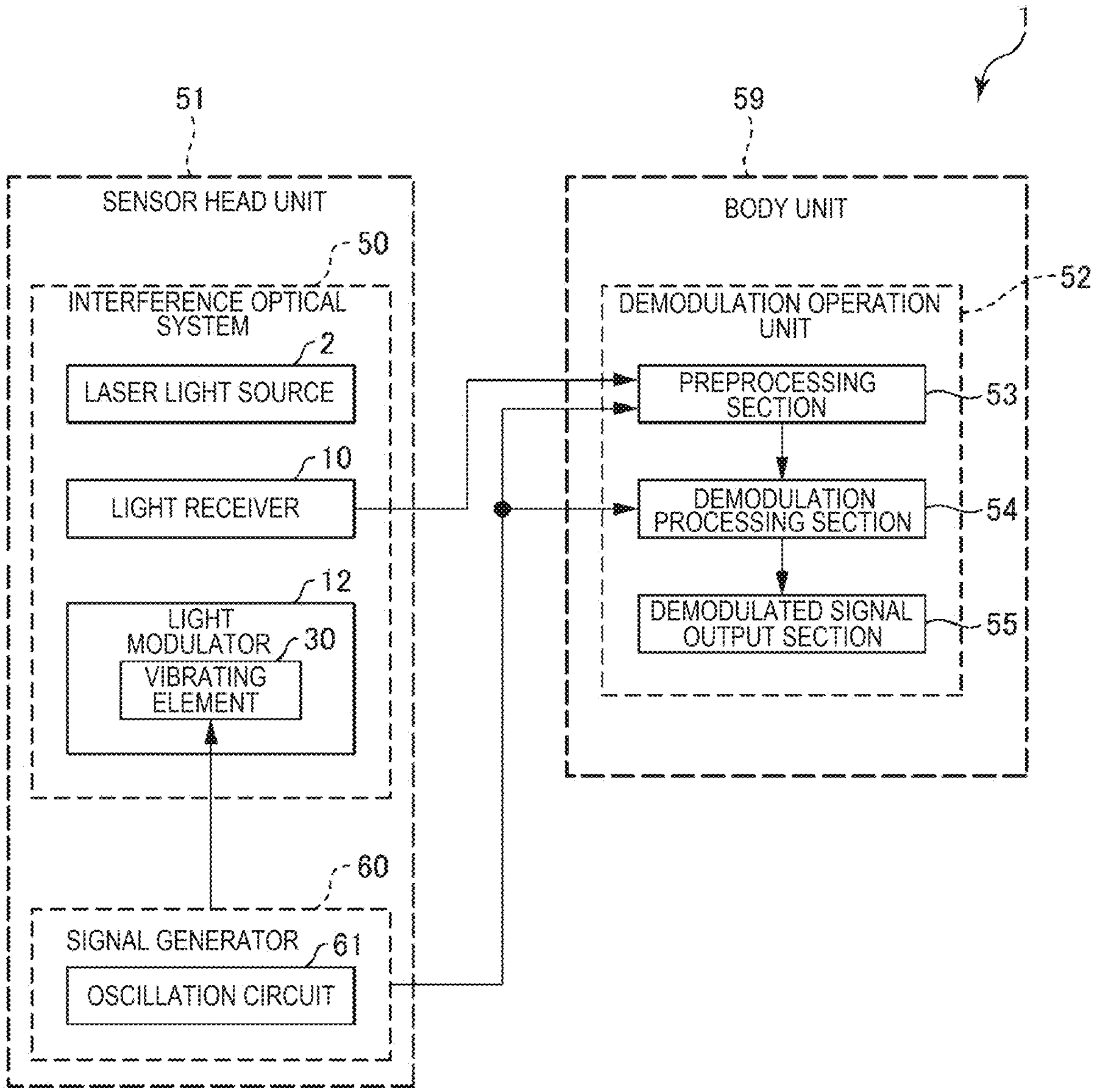
FIG. 1 is a functional block diagram showing a laser interferometer according to a first embodiment.
Figure 2:
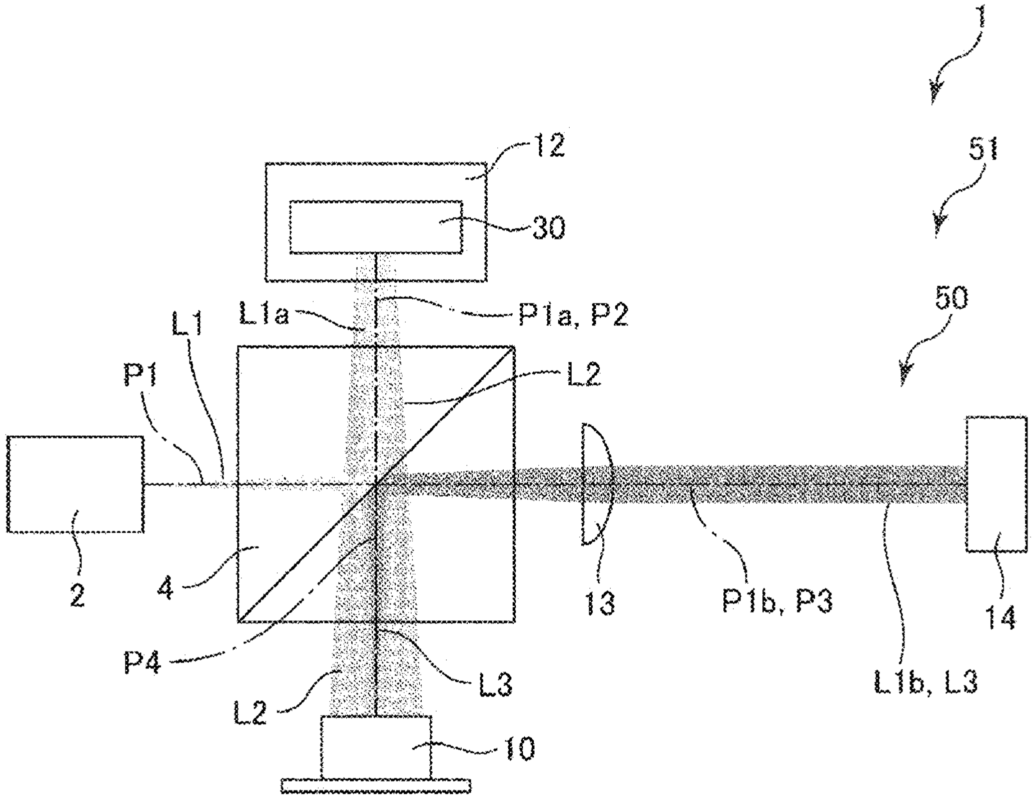
FIG. 2 is a schematic configuration diagram showing an interference optical system provided in the laser interferometer shown in FIG. 1.

FIG. 1 is a functional block diagram showing a laser interferometer 1 according to a first embodiment. FIG. 2 is a schematic configuration diagram showing an interference optical system 50 provided in the laser interferometer 1 shown in FIG. 1.

In the laser interferometer 1 shown in FIG. 1, a target object 14, which is shown in FIG. 2, and a light modulator 12 are irradiated with laser light (first split light L1*a* and second split light L1*b*). Object light L3 output from the target object 14 and reference light L2 output from the light modulator 12 are then caused to interfere with each other, and the interference light is received with a light receiver 10, which produces a light reception signal. A sample signal associated with the target object 14 is then extracted from the light reception signal by using optical heterodyne interferometry, and the displacement and the speed of the target object 14 are measured based on the sample signal.

The laser interferometer 1 shown in FIG. 1 includes a sensor head unit 51 and a body unit 59.

The sensor head unit 51 shown in FIG. 1 includes the interference optical system 50 and a signal generator 60. The sensor head unit 51, which is readily reduced in size and weight and readily made portable and installable, can be readily placed, for example, near the target object 14.

The body unit 59 includes a demodulation operation unit 52. The demodulation operation unit 52 demodulates the sample signal associated with the target object 14 from the light reception signal. The body unit 59 shown in FIG. 1 is separate from the sensor head unit 51, but may be integrated with the sensor head unit 51. At least one of the elements contained in the sensor head unit 51 shown in FIG. 1 may be contained in the body unit 59.

1.1. Interference Optical System

The interference optical system 50 shown in FIG. 2 is a Michelson interference optical system. The interference optical system 50 includes a laser light source 2, a light splitter 4, the light receiver 10, the light modulator 12, and a first light collecting lens 13.

The laser light source 2 outputs output light L1, which is laser light. The output light L1 travels along an optical path P1 and enters the light splitter 4. The optical path refers to a path along which light travels. The light splitter 4 splits the output light L1 into the first split light L1*a* and the second split light L1*b*.

The first split light L1*a* travels along an optical path P1*a* and enters the light modulator 12. The light modulator 12 includes a vibrating element 30, and modulates the frequency of the first split light L1*a* to generate the reference light L2, which is laser light containing a modulation signal. The modulation signal is a change in frequency added to the first split light L1*a* by the light modulator 12. The reference light L2 travels along an optical path P2 and enters the light splitter 4.

The second split light Lib travels along an optical path P1*b* and is incident on the target object 14. The second split light L1*b* incident on the target object 14 is reflected as the object light L3, which is laser light containing the sample signal associated with the target object 14. The sample signal is a Doppler signal resulting from displacement of the target object 14, and is a change in frequency added to the second split light L1*b*. The object light L3 travels along an optical path P3 and enters the light splitter 4.

The light splitter 4 mixes the reference light L2 and the object light L3 with each other. The reference light L2 after the mixing operation travels along an optical path P4 and enters the light receiver 10, and the object light L3 after the mixing operation travels along the optical path P4 and enters the light receiver 10. The optical paths P2 and P3 spatially coincide with each other, and optical interference occurs in the portion where the two optical paths spatially coincide with each other. The light receiver 10 detects the intensity of the light that is the mixture of the reference light L2 and the object light L3, and outputs the light reception signal according to the intensity.

In the interference optical system 50 described above, information on the phase of the target object 14 is determined with the aid of the optical heterodyne interferometry. Specifically, the two types of light (reference light L2 and object light L3) slightly different in frequency from each other are caused to interfere with each other, and the phase information is extracted from the resultant interference light. The displacement of the target object 14 is then determined from the phase information in the demodulation operation unit 52, which will be described later. In the optical heterodyne interferometry, when the phase information is extracted from the interference light, the extracted phase information is unlikely to be affected by stray light or other noise producing light.

1.1.1. Laser Light Source

The laser light source 2 is a laser light source that outputs the output light L1 (laser light), which is coherent light. The laser light source 2 is preferably a light source that outputs light having a linewidth shorter than or equal to those in the MHz band. Specific examples of the laser light source 2 may include gas lasers such as a He—Ne laser, and semiconductor laser devices such as a distributed feedback laser diode (DFB-LD), a fiber Bragg grating laser diode (FBG-LD), a vertical cavity surface emitting laser (VCSEL), and a Fabry-Perot laser diode (FP-LD).

It is particularly preferable that the laser light source 2 is a semiconductor laser device. The size of the laser light source 2 in particular can thus be reduced. The size of the laser interferometer 1 can therefore be reduced.

The output light L1 output from the laser light source 2 enters the light splitter 4 while the optical diameter of the output light L1 expands at a predetermined divergence angle due, for example, to the effect of optical diffraction, as shown in FIG. 2. An optical element that adjusts the divergence angle of the output light L1 may be disposed between the laser light source 2 and the light splitter 4 as necessary.

1.1.2. Light Splitter

The light splitter 4 shown in FIG. 2 is a non-polarizing beam splitter or an unpolarizing beam splitter that splits the output light L1 into two in accordance with a predetermined ratio. The light splitter 4 shown in FIG. 2 reflects part of the output light L1 to generate the first split light L1*a*, and transmits the other part of the output light L1 to generate the second split light L1*b* by way of example. The non-polarized beam splitter or the unpolarized beam splitter does not require a wave plate or any other element that controls the polarization and therefore contributes to reduction in the number of optical elements that constitute the interference optical system 50.

The light splitter 4 has the function of mixing the incident reference light L2 and object light L3 with each other. When the reference light L2 enters the light splitter 4 shown in FIG. 2, part of the reference light L2 passes through the light splitter 4. When the object light L3 enters the light splitter 4 shown in FIG. 2, part of the object light L3 is reflected off by the light splitter 4. The part of the reference light L2 and the part of the object light L3 are mixed with each other, and the mixture light enters the light receiver 10.

Examples of the type of the light splitter 4 may include a plate-shaped element and a stacked element in addition to the cube-shaped element shown in FIG. 2. Among the elements described above, a cube-shaped element is preferably used with regard to the capability to suppress the optical path difference between the reference light L2 and the object light L3.

1.1.3. Light Receiver

The light receiver 10 outputs a photocurrent (light reception signal) according to the intensity of the mixture light. Examples of the light receiver 10 may include a photodiode and a phototransistor. Note that the light receiver 10 only need to receive light containing a sample associated component and a modulated component, and the light to be received is not limited to the interference light described above as the result of interference between the reference light L2 containing the modulated component and the object light L3 containing the sample derived component. Further note that "demodulating the sample signal from the light reception signal" in the present specification includes demodulating the sample signal from any of various signals converted from the photocurrent (light reception signal).

1.1.4. Light Modulator

The light modulator 12 including the vibrating element 30 will next be described.

The light modulator 12 shown in FIG. 2 includes the vibrating element 30. The vibrating element 30 vibrates in the form of thickness-shear vibration at a predetermined mechanical resonance frequency and includes a diffraction grating that is not shown. When the diffraction grating is irradiated with the first split light L1*a*, diffracted light having a frequency shifted from that of the first split light L1*a* is generated, so that the reference light L2 containing the modulation signal is produced.

Note that the first split light L1*a* shown in FIG. 2 propagates while the optical diameter thereof increases (first split light L1*a* diverges) at a predetermined divergence angle. The reference light L2 therefore also enters the light splitter 4 while diverging at the same divergence angle.

Examples of the vibrating element 30 may include a quartz crystal vibrator, a silicon vibrator, a ceramic vibrator, and a piezoelectric device. Among the elements described above, the vibrating element 30 is preferably a quartz crystal vibrator, a silicon vibrator, or a ceramic vibrator. The vibrators described above are those utilizing a mechanical resonance phenomenon, unlike the other vibrators such as a piezoelectric device, and each therefore have a high Q-value, and can readily stabilize the natural frequency.

According to the light modulator 12 including the vibrating element 30, the volume and weight of the light modulator 12 can be greatly reduced as compared with light modulators including, for example, an acousto-optics modulator (AOM) or an electro-optic modulator (EOM). The size, weight, and power consumption of the laser interferometer 1 can therefore be reduced. Note that when the advantages described above are not required, the light modulator 12 can be replaced with any of the light modulators described above using the AOM or the EOM.

The light modulator 12 may, for example, be the light modulator disclosed in JP-A-2022-038156. In the publication of JP-A-2022-038156, a quartz crystal AT vibrator is presented as the vibrating element 30. Other examples of the vibrating element 30 may include an SC-cut quartz crystal vibrator, a tuning-fork-type quartz crystal vibrator, or a quartz crystal surface acoustic wave element.

The silicon vibrator is a vibrator including a single crystal silicon element manufactured from a single crystal silicon substrate by using a MEMS technology, and a piezoelectric film. The term MEMS (micro-electro-mechanical systems) means micro-electromechanical systems. The single crystal silicon element may, for example, have the shape of a cantilever, such as a two-leg tuning fork and a three-leg tuning fork, or the shape of a beam clamped at opposite ends. The oscillation frequency of the silicon vibrator ranges, for example, from about 1 kilohertz to several hundreds of megahertz.

The ceramic vibrator is a vibrator including a piezoelectric ceramic element manufactured by sintering a piezoelectric ceramic material, and electrodes. Examples of the piezoelectric ceramic material may include lead zirconate titanate (PZT) and barium titanate (BTO). The oscillation frequency of the ceramic vibrator ranges, for example, from about several hundreds of kilohertz to several tens of megahertz.

Among the vibrators described above, a quartz crystal vibrator is preferably used as the vibrating element 30. The quartz crystal vibrator has particularly high frequency stability because the quartz crystal itself is a piezoelectric material.

1.1.5. First Light Collecting Lens

The first light collecting lens 13 shown in FIG. 2 is disposed in the portion where the optical path P1*b* of the second split light L1*b* and the optical path P3 of the object light L3 coincide with each other. The first light collecting lens 13 has the function of collecting the incident second split light L1*b* and object light L3. The first light collecting lens 13 thus disposed in the optical path P1*b* can suppress the divergence angle of the second split light L1*b* output from the first light collecting lens 13 as compared with the divergence angle of the second split light L1*b* entering the first light collecting lens 13. In the example shown in FIG. 2, the second split light L1*b* so collimated that the divergence angle is substantially zero is generated. The target object 14 is irradiated with the collimated second split light Lib with the optical diameter thereof maintained. The object light L3, which the second split light L1*b* reflected off by the target object 14, is therefore also collimated light. The collimated object light L3 then enters the first light collecting lens 13 with the optical diameter of the object light L3 maintained.

As described above, the first light collecting lens 13 provided in the optical path P1*b* of the second split light L1*b* is likely to maintain the optical diameters of the second split light L1*b* and the object light L3, and can therefore fix the irradiation range over which the target object 14 is irradiated with the second split light L1*b* even when the working distance (distance between first light collecting lens 13 and target object 14) changes. A decrease in measurement accuracy of the laser interferometer 1 due to variation in the irradiation range can thus be suppressed. Furthermore, providing the first light collecting lens 13 can suppress a significant increase in the optical diameter of the object light L3 entering the first light collecting lens 13. When the optical diameter of the object light L3 is significantly increases, the amount of the object light L3 entering the first light collecting lens 13 decreases. Suppression of a significant increase in the optical diameter of the object light L3 can therefore suppress a decrease in the S/N ratio (signal-to-noise ratio) thereof.

The first light collecting lens 13 is any optical part having the function described above, and is, for example, an optical part called a collimating lens. The collimating lens may, for example, be a planoconvex aspherical lens. The first light collecting lens 13 may instead be configured with multiple optical elements.

The object light L3 having entered the first light collecting lens 13 is caused to converge by the aforementioned function provided by the first light collecting lens 13, and enters the light splitter 4.

The reference light L2 enters the light splitter 4 while diverging, and the object light L3 enters the light splitter 4 while converging, as described above. Part of the reference light L2 and part of the object light L3 are then mixed with each other in the optical path P4 and reach the light receiver 10 while passing through the same space. In the optical path P4, the reference light L2 and the object light L3 interfere with each other to generate mixture light containing an interference signal (beat signal).

Figure 3:
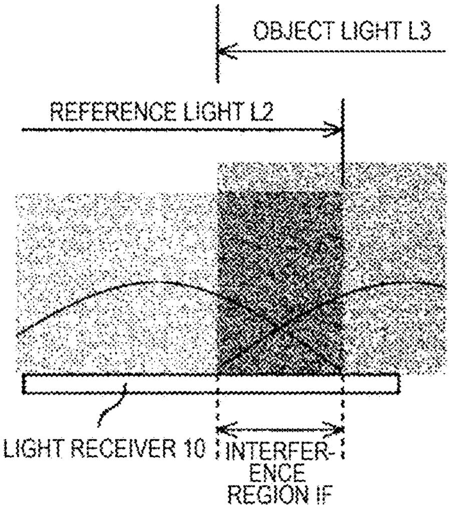
FIG. 3 is a conceptual view for illustrating an advantage provided by a first light collecting lens shown in FIG. 2.
Figure 3:
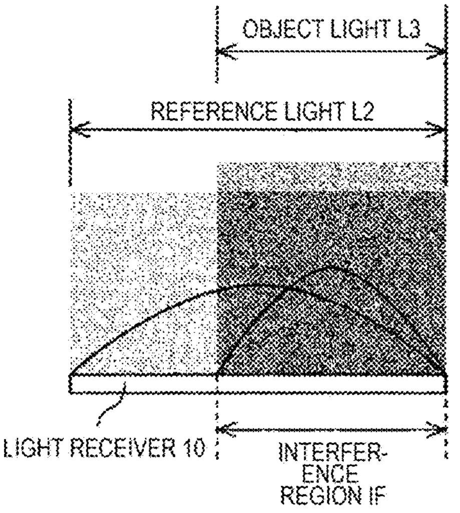

FIG. 3 is a conceptual view for illustrating advantages provided by the first light collecting lens 13 shown in FIG. 2. FIG. 3 shows the light intensity distributions in the form of pictures for illustration purposes under disturbance that causes the optical paths P2 and P3 to deviate from each other in a case where the first light collecting lens 13 is not provided and the case where the first light collecting lens 13 is provided. In the pictures, the horizontal axis represents the optical diameters and positions of the reference light L2 and the object light L3, and the vertical axis represents the light intensity. Each curve in FIG. 3 therefore represents the light intensity distribution of either the reference light L2 or the object light L3.

When the optical paths P2 and P3 positionally deviate from each other, the position where the reference light L2 or the object light L3 reaches the light receiver 10 is also shifted. A region where the beam of the reference light L2 and the beam of the object light L3 are superimposed on each other and interfere with each other (interference region IF) narrows in accordance with the amount of deviation. The size of the interference region IF and the light intensity in the interference region IF are reflected in the S/N ratio (signal-to-noise ratio) of the light reception signal.

When the first light collecting lens 13 is not provided, the object light L3 enters the light splitter 4 while diverging, as the reference light L2 does. The reference light L2 and the object light L3 at the light receiver 10 therefore have approximately the same large optical diameters. In this case, even a slight positional deviation is reflected more strongly in the S/N ratio (signal-to-noise ratio) of the light reception signal. Specifically, since the optical diameters are approximately the same, the interference region IF unfavorably narrows in accordance with the amount of deviation. As a result, the amplitude of the interference signal decreases, and the S/N ratio of the light reception signal decreases. The light intensity distribution of each of the reference light L2 and the object light L3 has, for example, a Gaussian distribution shape, as shown in FIG. 3. The effect of the positional deviation is therefore likely to be reflected in the interference signal, and the S/N ratio of the light reception signal is likely to decrease. Therefore, when the first light collecting lens 13 is not provided, the positional deviation of the optical paths P2 and P3 from each other easily lead to a decrease in the S/N ratio of the light reception signal. For these reasons, the resistance to disturbance decreases, and the difficulty in alignment of the interference optical system 50 increases.

On the other hand, when the first light collecting lens 13 is disposed in the portion where the optical path P1*b* and the optical path P3 coincide with each other, the optical diameter of the object light L3 can be made smaller than that of the reference light L2 at the light receiver 10. In this case, a sufficient interference region IF can be secured even when there is a slight positional deviation. That is, since the optical diameter of the object light L3 is smaller than that of the reference light L2, the beams are maintained superimposed on each other even when the optical paths P2 and P3 positionally deviate from each other. As a result, a decrease in the S/N ratio of the light reception signal can be suppressed. The resistance (robustness) of the measurement accuracy to disturbance can therefore be increased by providing the first light collecting lens 13. That is, the laser interferometer 1 that is unlikely to decrease measurement accuracy even when the laser interferometer receives disturbance can be realized.

The reference light L2 and the object light L3 have different optical diameters and is therefore likely to interfere with each other even when the optical paths P2 and P3 positionally deviate from each other. Therefore, the interference signal is readily acquired when alignment of the interference optical system 50 is made before or during measurement, so that the alignment can be made using the intensity of the interference signal as a guide. The laser interferometer 1 in which alignment of the interference optical system 50 is easy, and excellent usability is provided can be realized.

In the laser interferometer 1 shown in FIG. 2, the advantages described above are realized by the first light collecting lens 13 disposed as described above. The first light collecting lens 13 is sufficiently small and lightweight and can therefore contribute to reduction in size of the laser interferometer 1. In addition, the laser interferometer 1 does not need a feedback mechanism that detects disturbance and reflects the disturbance in measurement and is therefore readily reduced in size and weight also in this regard.

Note in the example shown in FIG. 2 that the first light collecting lens 13 is so configured that the first split light L1*a* output from the first light collecting lens 13 is collimated light. The first light collecting lens 13 may instead be so configured that the first split light L1*a* output from the first light collecting lens 13 converges. It is preferable in this case that the target object 14 is placed near the point where the first split light L1*a* is focused.

1.2. Signal Generator

The signal generator 60 shown in FIG. 1 outputs a drive signal to be input to the vibrating element 30, and a reference signal to be input to the demodulation operation unit 52.

The signal generator 60 shown in FIG. 1 includes an oscillation circuit 61. The oscillation circuit 61 drives the vibrating element 30 at a predetermined frequency (outputs drive signal to vibrating element 30), and outputs the reference signal. The vibrating element 30 is driven by the drive signal and adds the modulation signal to the first split light L1*a*. The demodulation operation unit 52 then demodulates the light reception signal containing the modulation signal based on the reference signal. Therefore, even when the modulation signal and the reference signal each receive disturbance, the demodulation operation unit 52 can cancel or reduce the effect of the disturbance. The laser interferometer 1 can therefore be a laser interferometer capable of performing measurement with higher accuracy.

The oscillation circuit 61 is, for example, the oscillation circuit disclosed in JP-A-2022-038156, and may instead be an oscillation circuit having another configuration.

Still instead, the signal generator 60 may include a signal generating device such as a function generator or a signal generator in place of the oscillation circuit 61.

1.3. Demodulation Operation Section

The demodulation operation unit 52 shown in FIG. 1 includes a preprocessing section 53, a demodulation processing section 54, and a demodulated signal output section 55. The functions provided by the functional sections are realized by hardware including, for example, a processor, a memory, an external interface, an input section, and a display section. The functions are specifically realized by the processor reading and executing a program stored in the memory. Note that the sections that constitute the demodulation operation unit 52 are capable of communicating with each other via an external bus.

Examples of the processor may include a central processing unit (CPU) and a digital signal processor (DSP). Note that the configuration in which any of the processors described above executes software may be replaced with a configuration in which a field-programmable gate array (FPGA), an application-specific integrated circuit (ASIC), or the like realizes the functions described above.

Examples of the memory may include a hard disk drive (HDD), a solid-state drive (SSD), an electrically erasable programmable read-only memory (EEPROM), a read-only memory (ROM), and a random access memory (RAM).

Examples of the external interface may include a digital input/output port such as a universal serial bus (USB), an Ethernet (registered trademark) port, a wireless LAN (local area network), and Bluetooth (registered trademark).

Examples of the input section may include a variety of input devices such as a keyboard, a mouse, a touch panel, and a touchpad. Examples of the display section may include a liquid crystal display panel and an organic electro-luminescence (EL) display panel.

Note that the external interface, the input section, and the display section only need to be provided as required, and may be omitted.

The preprocessing section 53 and the demodulation processing section 54 may, for example, be the preprocessing section and the demodulation section disclosed in JP-A-2022-038156.

The preprocessing section 53 preprocesses the light reception signal based on the reference signal. The preprocessing refers to the process of performing operation on the light reception signal based on the reference signal to generate a signal to which the known quadrature detection is applicable (preprocessed signal).

The demodulation processing section 54 demodulates the sample signal associated with the target object 14 from the preprocessed signal output from the preprocessing section 53 based on the reference signal, for example, by using the quadrature detection.

The demodulated signal output section 55 performs phase unwrapping, from the sample signal, specifically, phase information associated with the target object 14, to calculate the displacement of the target object 14. In this case, a displacement meter including the laser interferometer 1 is achieved. Furthermore, the speed can be calculated from the displacement, in which case, a speed meter including the laser interferometer 1 is achieved.

2. Second Embodiment

Figure 4:
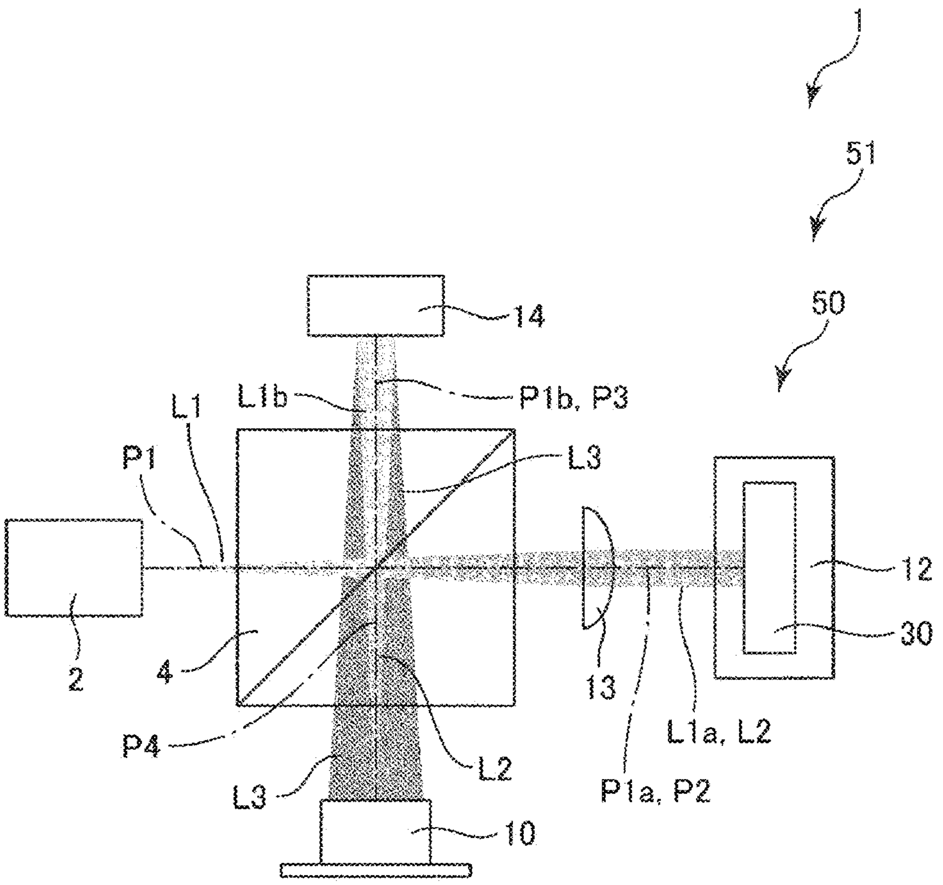
FIG. 4 is a schematic configuration diagram showing an interference optical system provided in a laser interferometer according to a second embodiment.

FIG. 4 is a schematic configuration diagram showing the interference optical system 50 provided in the laser interferometer 1 according to a second embodiment.

The second embodiment will be described below, and in the following description, differences from the first embodiment will be primarily described, and items that are the same as those in the first embodiment will not be described. In FIG. 4, the configurations that are the same as those in the first embodiment have the same reference characters.

The interference optical system 50 shown in FIG. 4 is the same as the interference optical system 50 shown in FIG. 2 except that the positions of the light modulator 12 and the target object 14 with respect to the light splitter 4 are swapped.

That is, the first light collecting lens 13 shown in FIG. 4 is disposed in the portion where the optical path P1*a* of the first split light L1*a* and the optical path P2 of the reference light L2 coincide with each other. In FIG. 4, the light having passed through the light splitter 4 is referred to as the first split light L1*a*, and the light reflected off by the light splitter 4 is referred to as the second split light L1*b*.

The first split light L1*a* shown in FIG. 4 is caused to converge when passing through the first light collecting lens 13, and enters the light modulator 12, for example, in the form of collimated light. The reference light L2 generated by the light modulator 12 is caused to converge when passing through the first light collecting lens 13, and enters the light splitter 4. The reference light L2 is then reflected off by the light splitter 4 and mixed with the object light L3.

The second split light L1*b* shown in FIG. 4 is incident on the target object 14 while diverging. The object light L3 generated by the target object 14 enters the light splitter 4. The object light L3 then passes through the light splitter 4 and mixed with the reference light L2.

The second embodiment described above can also provide advantages that are the same as those provided by the first embodiment. That is, the first light collecting lens 13 shown in FIG. 4 is so configured that the optical diameter of the reference light L2 is smaller than the optical diameter of the object light L3 at the light receiver 10. The laser interferometer 1 that readily allows size reduction, has measurement accuracy that is unlikely to decrease even when the laser interferometer receives disturbance, and excellent usability is provided can be realized.

3. Third Embodiment

Figure 5:
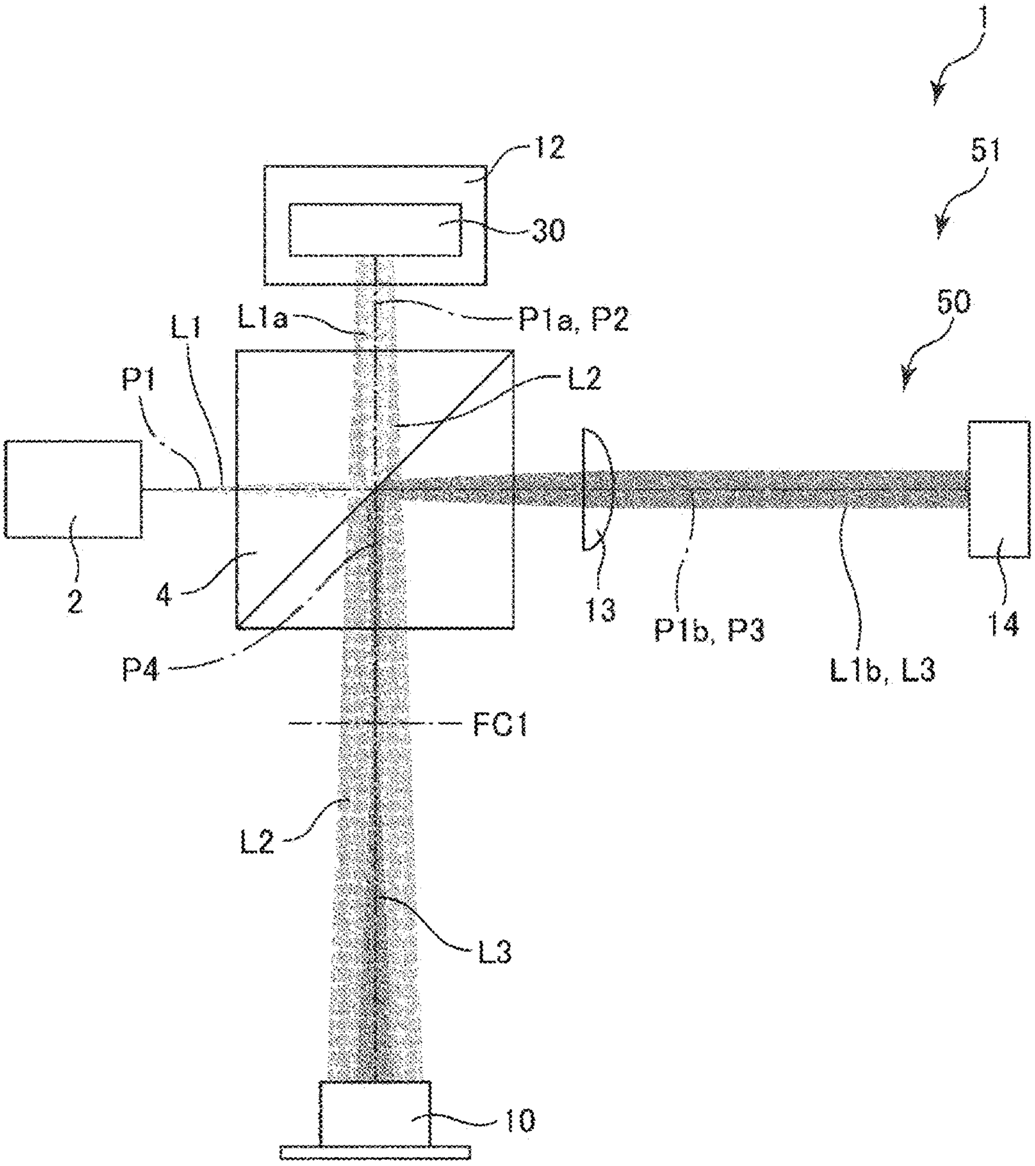
FIG. 5 is a schematic configuration diagram showing an interference optical system provided in a laser interferometer according to a third embodiment.

FIG. 5 is a schematic configuration diagram showing the interference optical system 50 provided in the laser interferometer 1 according to a third embodiment. The third embodiment will be described below, and in the following description, differences from the first embodiment will be primarily described, and items that are the same as those in the first embodiment will not be described. In FIG. 5, the configurations that are the same as those in the first embodiment have the same reference characters.

The interference optical system 50 shown in FIG. 5 is the same as the interference optical system 50 shown in FIG. 2 except that the light receiver 10 is disposed at a predetermined position in the optical path P4.

In the interference optical system 50 shown in FIG. 5, a focal point FC1 of the first light collecting lens 13 is located in the optical path P4. The focal point FC1 refers to a focal point at which the light passing through the first light collecting lens 13 and reflected off by the light splitter 4 is focused. The light receiver 10 shown in FIG. 5 is disposed farther from the light splitter 4 than the focal point FC1. According to the configuration described above, the angular difference between the light rays contained in the reference light L2 that reach the light receiver 10 and the light rays contained in the object light L3 that reach the light receiver 10 can be reduced by a greater amount than in the interference optical system 50 shown in FIG. 2. The term "light rays" in the present specification refers to the optical path of light in a unit area of a cross section.

Figure 6:
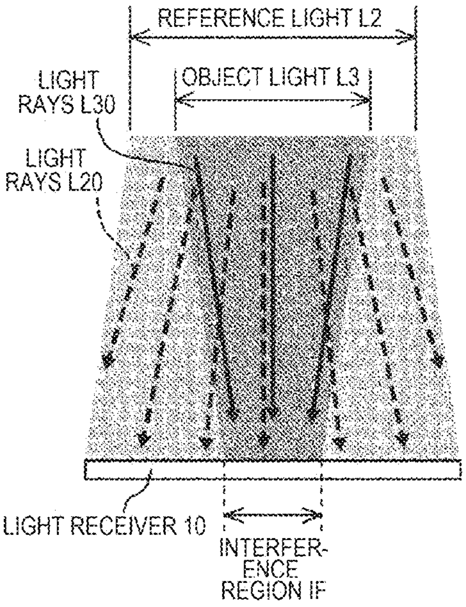
FIG. 6 is a conceptual view for illustrating advantages provided by the arrangement of a light receiver shown in FIG. 5.
Figure 6:
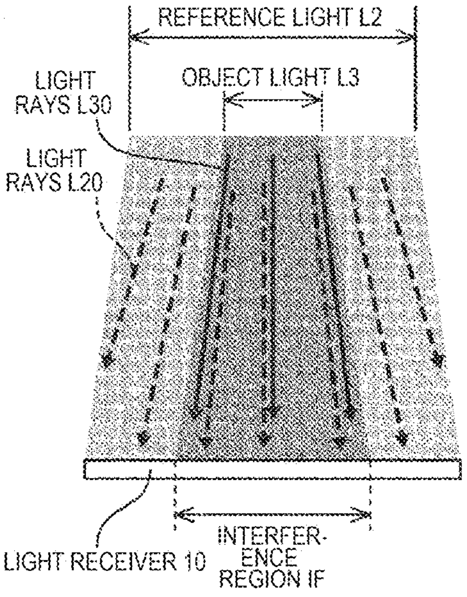

FIG. 6 is a conceptual view for illustrating advantages provided by the arrangement of the light receiver 10 shown in FIG. 5. FIG. 6 shows pictures for illustration purposes in which light rays L20 contained in the reference light L2 and light rays L30 contained in the object light L3 are expressed by arrows in the case where the light receiver 10 is disposed closer than the focal point FC1 (closer to light splitter 4 than focal point FC1) as shown in FIG. 2 and in the case where the light receiver 10 is disposed farther than the focal point FC1 (farther from light splitter 4 than focal point FC1) as shown in FIG. 5. It is assumed in the pictures that a cluster (bundle) of multiple light rays L20 is the reference light L2, and that a cluster (bundle) of multiple light rays L30 is the object light L3.

When the light receiver 10 is disposed closer than the focal point FC1, the reference light L2 reaches the light-receiver 10 while diverging, whereas the object light L3 reaches the light receiver 10 while converging. Therefore, the light rays L20 and the light rays L30 intersect with each other at the light receiving surface of the light receiver 10, and interference fringes (bright and dark stripes) are formed at the light receiving surface. Depending on an intersection angle between the two types of light rays that intersect with each other, the interference signal is averaged due to the effect of the bright and dark pattern, so that the S/N ratio of the light receiving signal decreases.

On the other hand, when the light receiver 10 is disposed farther than the focal point FC1, not only the reference light L2 (light not having passed through first light collecting lens 13) but also the object light L3 (light caused to converge by first light collecting lens 13) reach the light receiver 10 while diverging. Therefore, even when the light rays L20 and the light rays L30 approach a state in which the two types of light rays are parallel to each other and intersect with each other at the light receiving surface of the light receiver 10, the intersection angle can be sufficiently reduced. Therefore, generation of interference fringes can be suppressed, or the cycle of bright and dark portions can be increased even when interference fringes are generated. As a result, a decrease in the S/N ratio of the light reception signal due to the interference fringes can be suppressed. In the following description, the state in which the light rays L20 and the light rays L30 approach being parallel to each other is referred to as "relative parallelism of the light rays is high".

The third embodiment described above can also provide advantages that are the same as those provided by the first embodiment.

4. Fourth Embodiment

Figure 7:
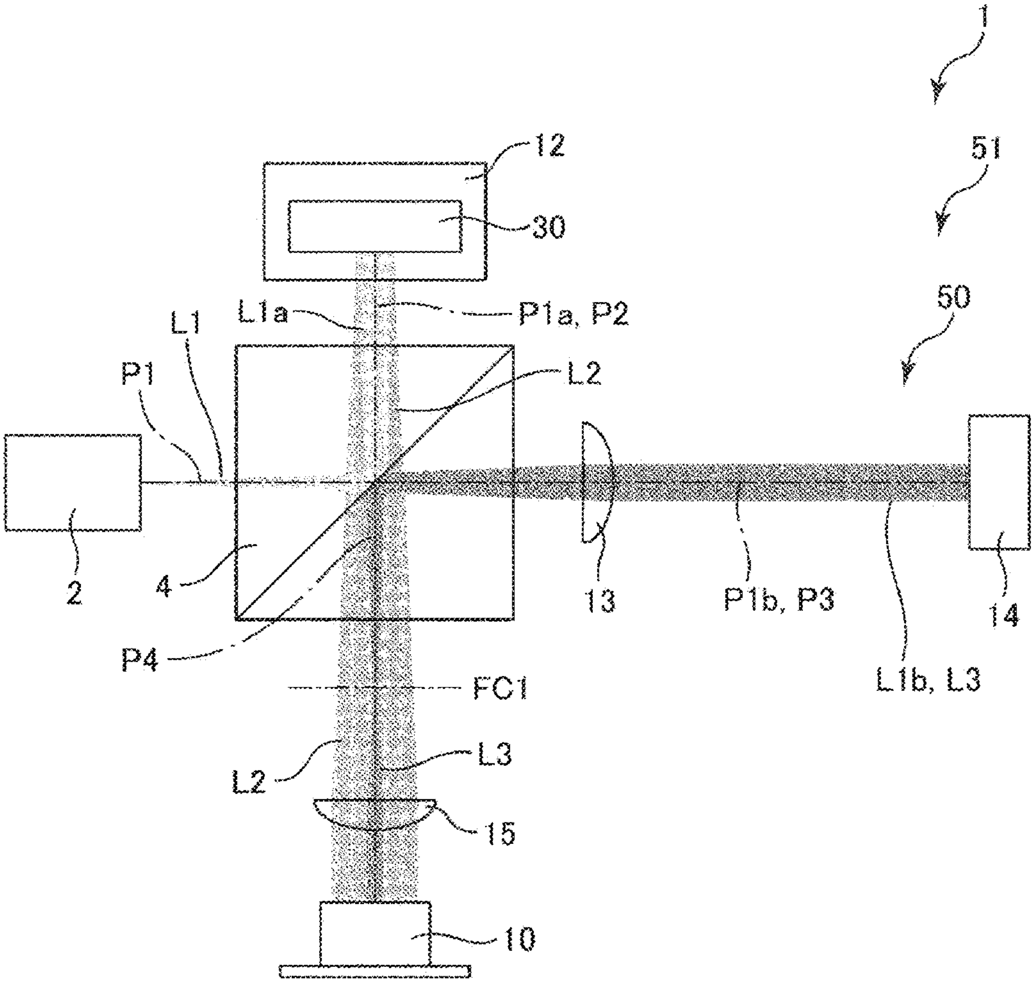
FIG. 7 is a schematic configuration diagram showing an interference optical system provided in a laser interferometer according to a fourth embodiment.

FIG. 7 is a schematic configuration diagram showing the interference optical system 50 provided in the laser interferometer 1 according to a fourth embodiment.

The fourth embodiment will be described below, and in the following description, differences from the third embodiment will be primarily described, and items that are the same as those in the third embodiment will not be described. In FIG. 7, the configurations that are the same as those in the third embodiment have the same reference characters.

The interference optical system 50 shown in FIG. 7 is the same as that in the third embodiment except that the former includes a second light collecting lens 15 disposed in the optical path P4.

In the interference optical system 50 shown in FIG. 7, the second light collecting lens 15 is disposed between the focal point FC1 and the light receiver 10. The second light collecting lens 15 has the function of collecting the incident reference light L2 and object light L3. The second light collecting lens 15 disposed in the optical path P4 allows the reference light L2, which is divergent light, to converge to suppress the divergence angle. In the example shown in FIG. 7, the reference light L2 is so collimated that the divergence angle thereof is substantially zero. The second light collecting lens 15 further causes the object light L3 having passed through the focal point FC1 and therefore being divergent light to converge. In the example shown in FIG. 7, the object light L3 is so collimated that the divergence angle thereof is substantially zero.

Figure 8:
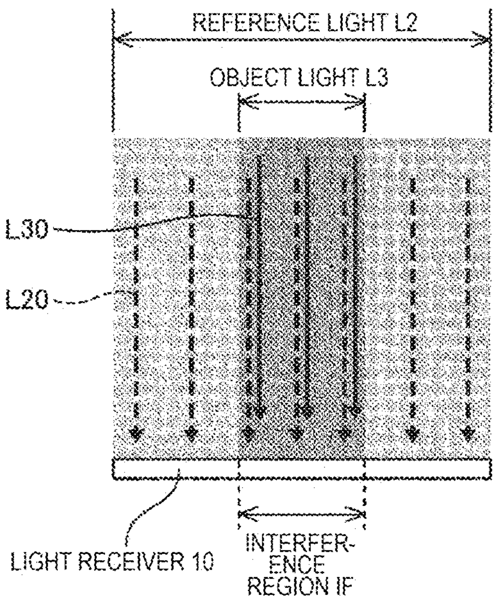
FIG. 8 is a conceptual view for illustrating advantages provided by a second light collecting lens shown in FIG. 7.

FIG. 8 is a conceptual view for illustrating advantages provided by the second light collecting lens 15 shown in FIG. 7. FIG. 8 shows a picture for illustration purposes in which the light rays L20 contained in the reference light L2 shown in FIG. 7 and the light rays L30 contained in the object light L3 shown in FIG. 7 are expressed by arrows.

The second light collecting lens 15 disposed between the focal point FC1 and the light receiver 10 can collimate, for example, each of the reference light L2 and the object light L3. Increase in the optical diameter of the reference light L2 and the optical diameter of the object light L3 at the light receiver 10 can thus be suppressed. As a result, the size of the light receiver 10 can be reduced, and in turn the size of the laser interferometer 1 can be reduced. In addition, relative parallelism of the light rays L20 and the light rays L30 is enhanced. A decrease in the S/N ratio of the light receiving signal due to the interference fringes in particular can thus be suppressed.

The second light collecting lens 15 is any optical part having the function described above, and is, for example, an optical part called a collimating lens. The collimating lens may, for example, be a planoconvex aspherical lens. The second light collecting lens 15 may instead be configured with multiple optical elements.

The present embodiment also provides advantages that are the same as those provided by the first embodiment.

5. Fifth Embodiment

Figure 9:
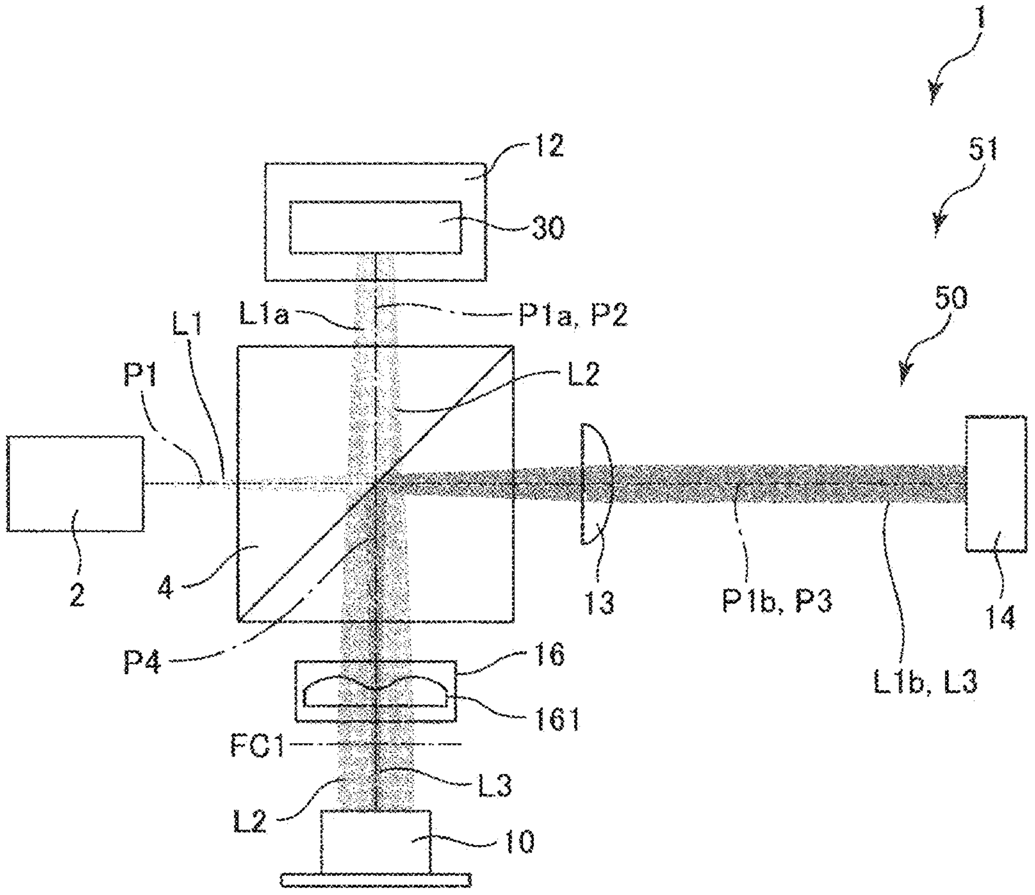
FIG. 9 is a schematic configuration diagram showing an interference optical system provided in a laser interferometer according to a fifth embodiment.

FIG. 9 is a schematic configuration diagram showing the interference optical system 50 provided in the laser interferometer 1 according to a fifth embodiment.

The fifth embodiment will be described below, and in the following description, differences from the third embodiment will be primarily described, and items that are the same as those in the third embodiment will not be described. In FIG. 9, the configurations that are the same as those in the third embodiment have the same reference characters.

The interference optical system 50 shown in FIG. 9 is the same as that in the third embodiment except that the former includes a light intensity distribution adjuster 16 disposed in the optical path P4.

In the interference optical system 50 shown in FIG. 9, the light intensity distribution adjuster 16 is disposed between the light splitter 4 and the focal point FC1. The light intensity distribution adjuster 16 has the function of adjusting the light intensity distributions of the incident reference light L2 and object light L3. The light intensity distribution adjuster 16 shown in FIG. 9 includes an aspherical lens 161. The function of the light intensity distribution adjuster 16 is determined in accordance, for example, with the shape of the aspherical surface of the aspherical lens 161.

Figure 10:
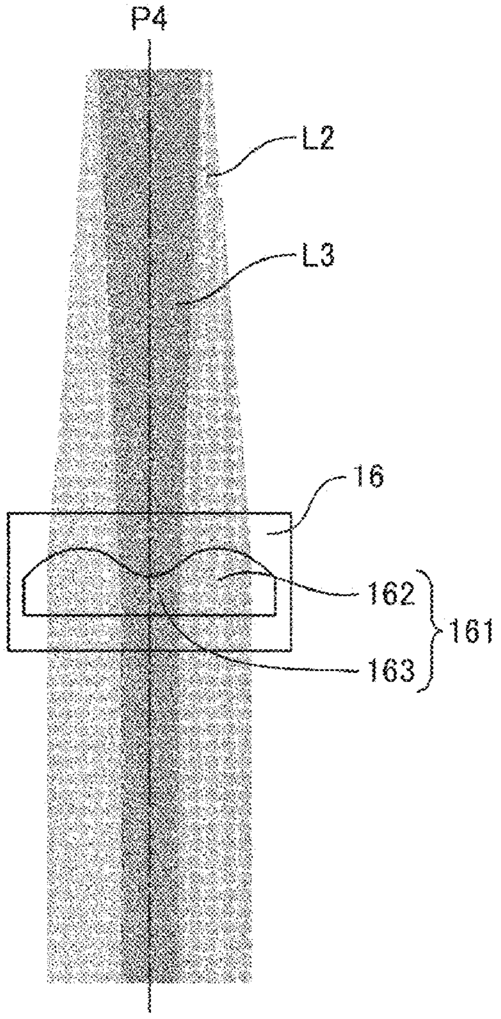
FIG. 10 cross-sectional view for is a illustrating the effect of an aspherical lens shown in FIG. 9.

FIG. 10 is a cross-sectional view for illustrating the effect of the aspherical lens 161 shown in FIG. 9.

The aspherical lens 161 shown in FIG. 10 includes an outer circumferential convex section 162 and a central concave section 163. The convex section 162 is a convex lens and has the function of causing incident light to converge. The concave section 163 is a concave lens and has the function of causing incident light to diverge. In the example shown FIG. 10, the interference optical system 50 is so configured that the reference light L2 enters the convex section 162 and the object light L3 enters the concave section 163. Since the reference light L2 that enters the convex section 162 is divergent light, the divergence is suppressed when the reference light L2 passes through the convex section 162. The reference light L2 can thus be collimated. Since the light intensity distribution adjuster 16 shown in FIG. 10 is disposed closer to the light splitter 4 than the focal point FC1, the object light L3 enters the concave section 163 while converging. The convergence of the object light L3 is therefore suppressed when the object light L3 passes through the concave section 163. The object light L3 can thus be collimated. Using the light intensity distribution adjuster 16 shown in FIG. 10 therefore allows collimation of both the reference light L2 and the object light L3.

The configuration described above can suppress increase in the optical diameter of the reference light L2 and the optical diameter of the object light L3 at the light receiver 10. As a result, the size of the light receiver 10 can be reduced, and in turn the size of the laser interferometer 1 can be reduced. A decrease in the S/N ratio of the light receiving signal due to the interference fringes in particular can be suppressed, as in the fourth embodiment.

The present embodiment also provides advantages that are the same as those provided by the first embodiment.

6. Sixth Embodiment

Figure 11:
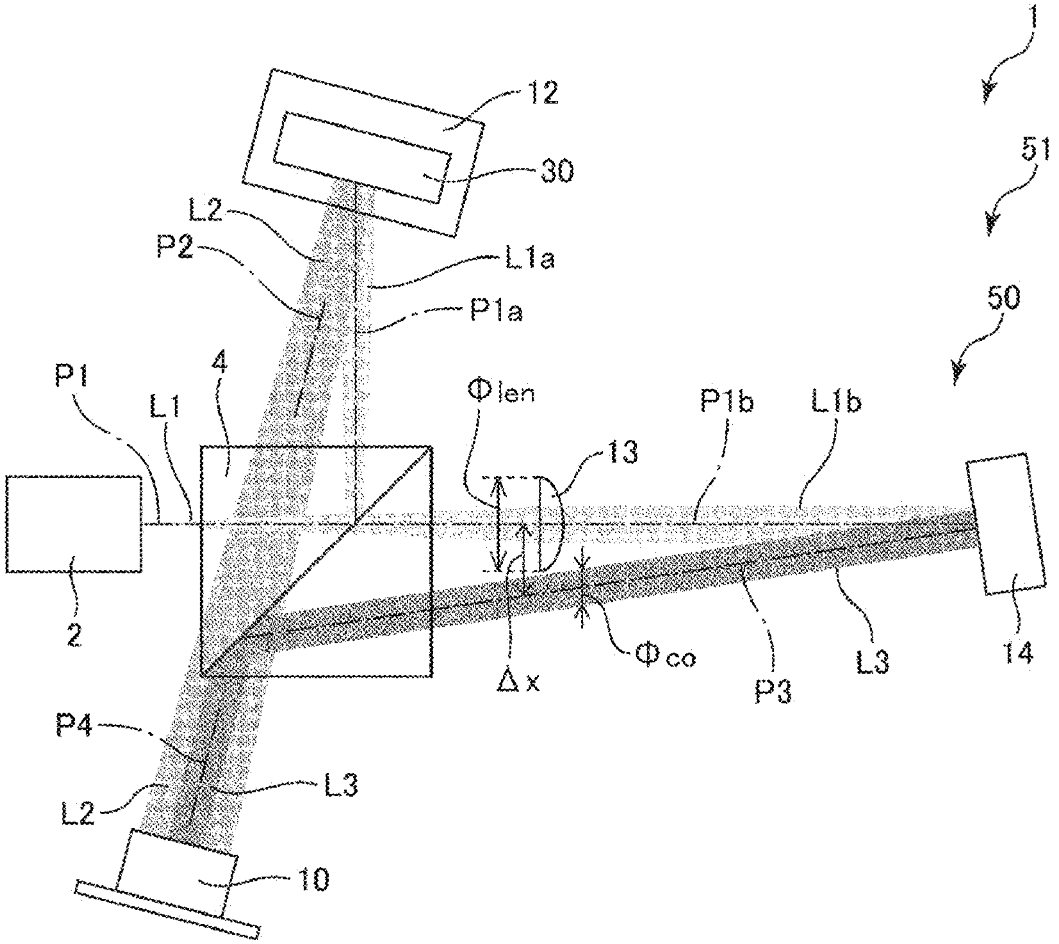
FIG. 11 is a schematic configuration diagram showing an interference optical system provided in a laser interferometer according to a sixth embodiment.

FIG. 11 is a schematic configuration diagram showing the interference optical system 50 provided in the laser interferometer 1 according to a sixth embodiment.

The sixth embodiment will be described below, and in the following description, differences from the first embodiment will be primarily described, and items that are the same as those in the first embodiment will not be described. In FIG. 11, the configurations that are the same as those in the first embodiment have the same reference characters.

The interference optical system 50 shown in FIG. 11 is the same as that in the first embodiment except that the optical path P1*a* and the optical path P2 do not coincide with each other and the optical path P1*b* and the optical path P3 do not coincide with each other.

That is, in the interference optical system 50 shown in FIG. 11, the posture of the light modulator 12 with respect to the light splitter 4 is so set that the optical path P1*a* and the optical path P2 deviate from each other. Furthermore, the posture of the target object 14 with respect to the light splitter 4 is so set that the optical path P1*b* and the optical path P3 deviate from each other.

In this case, the first split light L1*a* output from the light splitter 4 travels along the optical path P1*a* and enters the light modulator 12. The reference light L2 generated by the light modulator 12 then travels along the optical path P2 that deviates from the optical path P1*a* and enters the light splitter 4. The reference light L2 then passes through the light splitter 4 and is mixed with the object light L3 in the optical path P4.

The second split light Lib output from the light splitter 4 travels along the optical path P1*b*, passes through the first light collecting lens 13, and is incident on the target object 14. The object light L3 generated by the target object 14 travels along the optical path P3 that deviates from the optical path P1*b* and enters the light splitter 4. In this process, since the optical path P3 deviates from the optical path P1*b*, the object light L3 enters the light splitter 4 without traveling via the first light collecting lens 13. The object light L3 is then reflected off by the light splitter 4 and mixed with the reference light L2 in the optical path P4.

According to the configuration described above, the object light L3, for example, collimated by the first light collecting lens 13 can reach the light receiver 10 without caused to converge by the first light collecting lens 13. The present embodiment therefore allows enhancement of the relative parallelism of the light rays as compared with the case where the object light L3 passes through the first light collecting lens 13. Therefore, generation of interference fringes can be suppressed, or the cycle of bright and dark portions can be increased even when interference fringes are generated, so that a decrease in the S/N ratio of the light reception signal due to the interference fringes can be suppressed.

From the point of view of causing the object light L3 not to enter the first light collecting lens 13, it is preferable that the expression below is satisfied, $$(\Phi\text{len}+\Phi\text{co})/2<\Delta x$$

where Δx is the distance at the position of the first light collecting lens 13 between the center of the optical path P1*b* of the second split light L1*b* (center axis of first light collecting lens 13) and the center of the optical path P3 of the object light L3 (light output from first light collecting lens 13, traveling via target object 14, and then directed toward first light collecting lens 13).

In the expression described above, Φlen is the effective diameter of the first light collecting lens 13, and Φco is the optical diameter of the object light L3 (light directed toward first light collecting lens 13). When the distance Δx satisfies the expression described above, the object light L3 is not allowed to enter the first light collecting lens 13. Unintentional convergence of the object light L3 can thus be avoided.

The present embodiment can also provide advantages that are the same as those provided by the first embodiment, that is, the measurement accuracy is unlikely to decrease even when the laser interferometer receives disturbance, and the alignment of the interference optical system is readily made. As a result, the laser interferometer 1 having high resistance to disturbance and excellent usability can be obtained.

Note in the present embodiment that the state described above in which the optical paths do not coincide with each other is realized by tilting the posture of each of the light modulator 12 and the light receiver 10 with respect to the light splitter 4, but how to realize the state described above is not limited to the above. For example, the state in which the optical paths do not coincide with each other may be realized by adding light splitters or mirrors that are not shown without tilting the light modulator 12 and the light receiver 10.

In the present embodiment, the first light collecting lens 13 is disposed in the optical path P1*b*, and may instead be disposed in the optical path P1*a*. In this case, the first split light L1*a* output from the light splitter 4 travels along the optical path P1*a*, travels along the first light collecting lens 13, and enters the light modulator 12. The reference light L2 enters the light splitter 4 without traveling via the first light collecting lens 13. Although the positions of the reference light L2 and the object light L3 are swapped in FIG. 11 in the mixture light traveling along the optical path P4, advantages that are the same as those provided by the present embodiment are provided.

7. Seventh Embodiment

Figure 12:
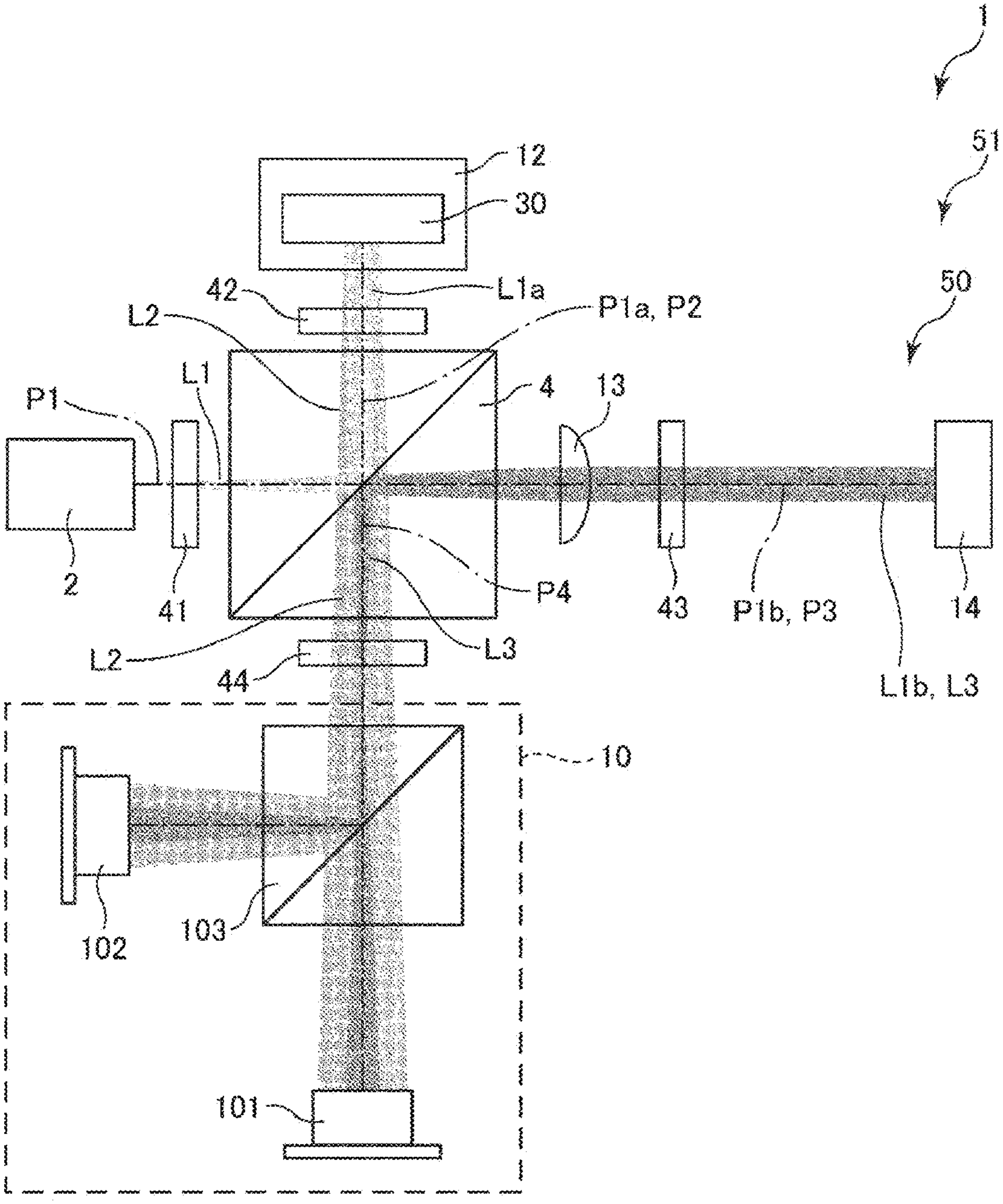
FIG. 12 is a schematic configuration diagram showing an interference optical system provided in a laser interferometer according to a seventh embodiment.

FIG. 12 is a schematic configuration diagram showing the interference optical system 50 provided in the laser interferometer 1 according to a seventh embodiment.

The seventh embodiment will be described below, and in the following description, differences from the first embodiment will be primarily described, and items that are the same as those in the first embodiment will not be described. In FIG. 12, the configurations that are the same as those in the first embodiment have the same reference characters.

The interference optical system 50 shown in FIG. 12 is the same as the interference optical system 50 shown in FIG. 2 except that the light splitter 4 is a polarizing beam splitter, and that the light receiver 10 is configured with a light receiving module based on differential amplification.

The light splitter 4 shown in FIG. 12 is a polarizing beam splitter and has the function of reflecting S-polarized light and transmitting P-polarized light. Specifically, the light splitter 4 shown in FIG. 12 splits the output light L1 into first split light L1*a* that is S-polarized light and second split light L1*b* that is P-polarized light. The light splitter 4 shown in FIG. 12 having the function described above is likely to suppress the amount of light lost when the output light L1 is split into two. A decrease in the S/N ratio of the light reception signal resulting from the amount of lost light can thus be suppressed.

A half-wave plate 41 is disposed in the optical path P1 between the laser light source 2 and the light splitter 4 shown in FIG. 12. The output light L1 output from the laser light source 2 passes through the half-wave plate 41, which converts the output light L1 into linearly polarized light containing S-polarized light and P-polarized light mixed with each other at an intensity ratio of, for example, 50:50.

A quarter-wave plate 42 is disposed in the optical path P1*a* between the light splitter 4 and the light modulator 12 shown in FIG. 12. The first split light L1*a*, which is S-polarized light output from the light splitter 4, is converted into circularly polarized light by the quarter-wave plate 42. The circularly polarized light enters the light modulator 12 and becomes the reference light L2.

The quarter-wave plate 42 is disposed in the optical path P2 between the light modulator 12 and the light splitter 4 shown in FIG. 12. The reference light L2 travels along the optical path P2, is converted into P-polarized light by the quarter-wave plate 42, and enters the light splitter 4. The reference light L2 then passes through the light splitter 4 and is mixed with the object light L3 in the optical path P4.

The first light collecting lens 13 and a quarter wave plate 43 are disposed in the optical path P1*b* between the light splitter 4 and the target object 14 shown in FIG. 12. The second split light L1*b*, which is P-polarized light output from the light splitter 4, is caused to converge, for example, is collimated by the first light collecting lens 13. The collimated second split light L1*b* is converted into circularly polarized light by the quarter-wave plate 43. The circularly polarized light is incident on the target object 14 and becomes object light L3.

The quarter-wave plate 43 and the first light collecting lens 13 are disposed in the optical path P3 between the target object 14 and the light splitter 4 shown in FIG. 12. The object light L3 travels along the optical path P3 and is converted into S-polarized light by the quarter-wave plate 43. The object light L3 converted into S-polarized light is caused to converge by the first light collecting lens 13. The object light L3 is then reflected off by the light splitter 4 and mixed with the reference light L2 in the optical path P4.

A half-wave plate 44 is disposed in the optical path P4. The mixture light passes through the half-wave plate 44, which aligns the polarization directions of the mixture light with one another. The reference light L2 and the object light L3 thus interfere with each other, and the mixture light containing the interference signal enters the light receiver 10.

The light receiver 10 shown in FIG. 12 is a light receiving module based on differential amplification, as described above. The light receiver 10 shown in FIG. 12 includes a first PD 101, a second PD 102, and a PBS 103. The first PD 101 and the second PD 102 are each, for example, a photodiode. A polarizing beam splitter is preferably used as the PBS 103. The mixture light having entered the light receiver 10 is split into S-polarized light and P-polarized light by the PBS 103. The P-polarized light is received by the first PD 101, and the S-polarized light is received by the second PD 102. Such a light receiving module based on differential amplification can be used as the light receiver 10 to cancel or reduce noise contained in the mixture light, which is the mixture of the reference light L2 and the object light L3, so that the S/N ratio of the light receiving signal in particular can be increased. Note that the optical elements in the light receiver 10 may not be modularized. The PBS 103 is preferably a cube-shaped element from the point of view of the requirement of a zero optical path difference between the optical path that reaches the first PD 101 and the optical path that reaches the second PD 102.

The seventh embodiment described above can also provide advantages that are the same as those provided by the first embodiment.

8. Advantages Provided by Embodiments Described Above

As described above, the laser interferometer 1 according to any of the embodiments described above includes the laser light source 2, the light splitter 4, the light modulator 12, the light receiver 10, and the first light collecting lens 13. The laser light source 2 outputs the output light L1 (laser light). The light splitter 4 splits the output light L1 into the first split light L1*a* and the second split light L1*b*. The light modulator 12 modulates the frequency of the first split light L1*a* to generate the reference light L2. The light receiver 10 receives the object light L3, which is generated by the second split light L1*b* reflected off by the target object 14, and the reference light L2. The first light collecting lens 13 is disposed in the optical path P1*a* of the first split light L1*a* or the optical path P1*b* of the second split light L1*b*, and collects the incident light. When the first light collecting lens 13 is disposed in the optical path P1*a* of the first split light L1*a*, the first light collecting lens 13 is so configured that the optical diameter of the reference light L2 is smaller than the optical diameter of the object light L3 at the light receiver 10. When the first light collecting lens 13 is disposed in the optical path P1*b* of the second split light L1*b*, the first light collecting lens 13 is so configured that the optical diameter of the object light L3 is smaller than the optical diameter of the reference light L2 at the light receiver 10.

According to the configuration described above, the optical diameter of either the reference light L2 or the object light L3 is smaller than the other, so that a region where the two types of light are superimposed on each other and interfere with each other is likely to be secured, and the interference state is likely to be maintained, for example, even when the laser interferometer 1 receives disturbance such as vibration and impact, whereby the S/N ratio of the reception light signal is unlikely to decrease. In addition, the first light collecting lens 13 is sufficiently small and lightweight, and it is not necessary to provide a feedback mechanism or the like that detects disturbance and reflects the disturbance in measurement. According to the configuration described above, the laser interferometer 1 can be a laser interferometer that readily allows size reduction, has measurement accuracy that is unlikely to decrease even when the laser interferometer receives disturbance, and excellent usability is provided can be realized.

Furthermore, in the laser interferometer 1 according to one of the embodiments described above, when the focal point FC1 of the first light collecting lens 13 is placed in the optical path that couples the first light collecting lens 13 and the light receiver 10 to each other via the light splitter 4, the light receiver 10 is disposed farther from the light splitter 4 than the focal point FC1.

According to the configuration described above, not only the reference light L2 (light not having passed through first light collecting lens 13) but also the object light L3 (light caused to converge by first light collecting lens 13) reaches the light receiver 10 while diverging. The relative parallelism of the light rays is thus enhanced, so that a decrease in the S/N ratio of the light receiving signal due to the interference fringes can be suppressed.

In the laser interferometer 1 according to one of the embodiments described above, the first light collecting lens 13 is disposed in the optical path P1*b* of the second split light L1*b*.

The configuration described above, which is likely to maintain the optical diameter of each of the second split light L1*b* and the object light L3, can fix the irradiation range over which the target object 14 is irradiated with the second split light L1*b* even when the working distance (distance between first light collecting lens 13 and target object 14) changes. A decrease in measurement accuracy of the laser interferometer 1 due to variation in the irradiation range can thus be suppressed. Furthermore, a significant increase in the optical diameter of the object light L3 entering the first light collecting lens 13 can be suppressed. When the optical diameter of the object light L3 is significantly increases, the amount of the object light L3 entering the first light collecting lens 13 decreases. Suppression of a significant increase in the optical diameter of the object light L3 can therefore suppress a decrease in the S/N ratio of the light reception signal.

In the laser interferometer 1 according to any of the embodiments described above, the first light collecting lens 13 is a collimating lens.

The configuration described above, which is likely to maintain the optical diameter of the light radiated onto each of the light modulator 12 and the target object 14, can fix the irradiation range over which the light modulator 12 and the target object 14 are irradiated with the two types of split light, and suppress a significant increase in the optical diameters thereof. A decrease in the S/N ratio of the light reception signal can thus be suppressed.

In the laser interferometer 1 according to one of the embodiments described above in which the first light collecting lens 13 is disposed in the optical path P1*a* of the first split light L1*a*, the first light collecting lens 13 is so configured that the first split light L1*a* passes through the first light collecting lens 13, but the reference light L2 does not pass through the first light collecting lens 13. In the laser interferometer 1 according to one of the embodiments described above in which the first light collecting lens 13 is disposed in the optical path P1*b* of the second split light Lib, the first light collecting lens 13 is so configured that the second split light Lb passes through the first light collecting lens 13, but the object light L3 does not pass through the first light collecting lens 13. $(\Phi len+\Phi co)/2<\Delta x$ is satisfied, where Φlen represents the effective diameter of the first light collecting lens 13, Φco represents the optical diameter of the light output from the first light collecting lens 13, traveling via the light modulator 12 or the target object 14, and then directed toward the first light collecting lens 13, and Δx represents the distance at the position of the first light collecting lens 13 between the center axis of the first light collecting lens 13 and the center of the optical path of the light directed toward the first light collecting lens 13.

The configuration described above does not allow the light traveling via the light modulator 12 or the target object 14 and then directed toward the first light collecting lens 13 to enter the first light collecting lens 13. Unintentional convergence of the light can thus be avoided.

The laser interferometer 1 according to one of the embodiments described above includes the second light collecting lens 15, which is disposed in the optical path P4, which couples the light splitter 4 and the light receiver 10 to each other, and collects the incident light.

The configuration described above can, for example, collimate each of the reference light L2 and the object light L3 in the optical path P4. Increase in the optical diameter of the reference light L2 and the optical diameter of the object light L3 at the light receiver 10 can thus be suppressed. As a result, the size of the light receiver 10 can be reduced, and in turn the size of the laser interferometer 1 can be reduced. Furthermore, the relative parallelism of the light rays can be enhanced. A decrease in the S/N ratio of the light receiving signal due to the interference fringes in particular can thus be suppressed.

The laser interferometer 1 according to one of the embodiments described above includes the light intensity distribution adjuster 16, which is disposed in the optical path P4, which couples the light splitter 4 and the light receiver 10 to each other, and adjusts the in-cross-section intensity distribution of the incident light.

The configuration described above can, for example, collimate each of the reference light L2 and the object light L3 in the optical path P4. Increase in the optical diameter of the reference light L2 and the optical diameter of the object light L3 at the light receiver 10 can thus be suppressed. As a result, the size of the light receiver 10 can be reduced, and in turn the size of the laser interferometer 1 can be reduced. Furthermore, the relative parallelism of the light rays can be enhanced. A decrease in the S/N ratio of the light receiving signal due to the interference fringes in particular can thus be suppressed.

In the laser interferometer 1 according to the embodiment described above, the light intensity distribution adjuster 16 has the function of causing the light having passed through the first light collecting lens 13 to diverge and causing the light not having passed through the first light collecting lens 13 to converge.

The configuration described above can, for example, collimate the divergent reference light L2 and further collimate the convergent object light L3 in accordance with the function of the light intensity distribution adjuster 16. Increase in the optical diameter of the reference light L2 and the optical diameter of the object light L3 at the light receiver 10 can thus be suppressed. As a result, the size of the light receiver 10 can be reduced, and in turn the size of the laser interferometer 1 can be reduced. Furthermore, the relative parallelism of the light rays can be enhanced. A decrease in the S/N ratio of the light receiving signal due to the interference fringes in particular can thus be suppressed.

In the laser interferometer 1 according to one of the embodiments described above, the light receiver 10 is a light receiving module based on differential amplification.

The configuration described above can cancel or reduce noise contained in the mixture light, which is the mixture of the reference light L2 and the object light L3, so that the S/N ratio of the light receiving signal in particular can be increased.

In the laser interferometer 1 according to one of the embodiments described above, the light splitter 4 is a polarizing beam splitter.

The configuration described above is likely to suppress the amount of light lost when the output light L1 (laser light) is split into two. A decrease in the S/N ratio of the light reception signal resulting from the amount of lost light can thus be suppressed.

The laser interferometer according to an embodiment of the present disclosure has been described above based on each of the embodiments shown in the drawings, but the laser interferometer according to the present disclosure is not limited to the embodiments described above, and the configuration of each section can be replaced with any configuration having the same function. Furthermore, any other constituent elements can be added to the laser interferometer according to any of the embodiments described above.

The laser interferometer according to an embodiment of the present disclosure may have a configuration that is a combination of two or more of the embodiments described above.

Furthermore, the laser interferometer according to any of the embodiments of the present disclosure is applicable, for example, a to vibration meter, an inclinometer, and a distance meter (length measuring device) in addition to the displacement meter or the speed meter described above. In addition, examples of the applications of the laser interferometer according to any of the embodiments of the present disclosure may include: an optical comb interference measurement technology that enables, for example, distance measurement, 3D imaging, and spectroscopy; an optical fiber gyro that implements, for example, an angular velocity sensor and an angular acceleration sensor; and a Fourier spectrometer including a moving mirror device, such as a Fourier spectroscopic analyzer and a shape measuring apparatus.

Out of the apparatuses described above, the Fourier spectroscopic analyzer is applicable, for example, to a Fourier infrared transform spectroscopy (FT-IR) analyzer, a Fourier transform near-infrared spectroscopy (FT-NIR) analyzer, a Fourier transform visible spectroscopy (FT-VIS) analyzer, a Fourier transform ultraviolet spectroscopy (FT-UV) analyzer, and a Fourier transform terahertz spectroscopy (FT-THz) analyzer.

The shape measuring apparatus is applicable, for example, to a white-light interferometric shape measuring apparatus, and an optical tomographic (OCT) imaging apparatus.

Two or more of the laser light source, the light modulator, and the light receiver may be placed on a same substrate. The size and the weight of the interference optical system can thus be readily reduced, and the interference optical system can be more readily assembled.

Furthermore, the embodiments described above each have what is called a Michelson interference optical system, and the laser interferometer according to any of the embodiments of the present disclosure is also applicable to a laser interferometer including an interference optical system of another type, for example, a Mach-Zehnder interference optical system.

What is claimed is:

1. A laser interferometer comprising:
- a laser light source configured to output laser light;
- a light splitter configured to split the laser light into first split light and second split light;
- a light modulator configured to modulate a frequency of the first split light to generate reference light;
- a light receiver configured to receive object light generated by the second split light reflected off by a target object, and the reference light; and
- a first light collecting lens disposed in an optical path of the first split light or an optical path of the second split light and configured to collect incident light,
- wherein the first light collecting lens is configured, in the optical path of the first split light, that an optical diameter of the reference light is smaller than an optical diameter of the object light at the light receiver, and,
- the first light collecting lens is configured, in the optical path of the second split light, that the optical diameter of the object light is smaller than the optical diameter of the reference light at the light receiver.

2. The laser interferometer according to claim 1, wherein a focal point of the first light collecting lens is located in an optical path that couples the first light collecting lens and the light receiver to each other via the light splitter, and
- the light receiver is disposed farther from the light splitter than the focal point of the first light collecting lens.

3. The laser interferometer according to claim 1, wherein the first light collecting lens is disposed in the optical path of the second split light.

4. The laser interferometer according to claim 1, wherein the first light collecting lens is a collimating lens.

5. The laser interferometer according to claim 4, wherein,
- the first light collecting lens is configured, in the optical path of the first split light, that the first split light passes through the first light collecting lens and the reference light does not pass through the first light collecting lens,
- the first light collecting lens is configured, in the optical path of the second split light, that the second split light passes through the first light collecting lens and the object light does not pass through the first light collecting lens, and $$(\Phi len+\Phi co)/2<\Delta x \text{ is satisfied,}$$

- where Φlen represents an effective diameter of the first light collecting lens,
- Φco represents an optical diameter of light output from the first light collecting lens, traveling via the light modulator or the target object, and then directed toward the first light collecting lens, and
- Δx represents a distance at a position of the first light collecting lens between a center axis of the first light collecting lens and a center of an optical path of the light directed toward the first light collecting lens.

6. The laser interferometer according to claim 1, further comprising a second light collecting lens disposed in an optical path that couples the light splitter and the light receiver to each other and configured to collect incident light.

7. The laser interferometer according to claim 1, further comprising a light intensity distribution adjuster disposed in an optical path that couples the light splitter and the light receiver to each other and configured to adjust an intensity distribution in a cross section of incident light.

8. The laser interferometer according to claim 7, wherein the light intensity distribution adjuster diverges light that passes through the first light collecting lens and converges light that does not pass through the first light collecting lens.

9. The laser interferometer according to claim 1, wherein the light receiver is a light receiving module based on differential amplification.

10. The laser interferometer according to claim 1, wherein the light splitter is a polarizing beam splitter.

* * * * *